United States Patent
King

(10) Patent No.: US 9,761,129 B2
(45) Date of Patent: *Sep. 12, 2017

(54) INTELLIGENT INFRARED REMOTE PAIRING

(71) Applicant: Apple Inc., Cupertino, CA (US)

(72) Inventor: Nicholas Vincent King, San Jose, CA (US)

(73) Assignee: Apple Inc., Cupertino, CA (US)

( * ) Notice: Subject to any disclaimer, the term of this patent is extended or adjusted under 35 U.S.C. 154(b) by 442 days.

This patent is subject to a terminal disclaimer.

(21) Appl. No.: 14/282,006

(22) Filed: May 20, 2014

(65) Prior Publication Data

US 2014/0255025 A1 Sep. 11, 2014

Related U.S. Application Data

(63) Continuation of application No. 12/203,904, filed on Sep. 3, 2008, now Pat. No. 8,736,427.

(51) Int. Cl.
| | |
|---|---|
| *G05B 11/01* | (2006.01) |
| *G08C 23/04* | (2006.01) |
| *G06F 13/38* | (2006.01) |
| *H04B 10/077* | (2013.01) |

(52) U.S. Cl.
CPC ........... *G08C 23/04* (2013.01); *G06F 13/385* (2013.01); *H04B 10/0775* (2013.01)

(58) Field of Classification Search
CPC .............. G08C 17/02; G08C 2201/10; H04N 21/42207
USPC ...................................................... 340/12.22
See application file for complete search history.

(56) References Cited

U.S. PATENT DOCUMENTS

| | | | |
|---|---|---|---|
| 3,924,120 A | 12/1975 | Cox, III | |
| 4,545,071 A | 10/1985 | Freeburg | |
| 4,744,083 A | 5/1988 | O'Neill et al. | |
| 5,276,680 A | 1/1994 | Messenger | |
| 7,925,022 B2 * | 4/2011 | Jung | H04L 63/061 380/247 |
| 8,736,427 B2 * | 5/2014 | King | G06F 13/385 340/12.22 |

(Continued)

FOREIGN PATENT DOCUMENTS

WO 9927465 6/1999

OTHER PUBLICATIONS

U.S. Appl. No. 12/203,904, filed Sep. 3, 2008, Nicholas Vincent King.

(Continued)

*Primary Examiner* — Vernal Brown
(74) *Attorney, Agent, or Firm* — Meyertons, Hood, Kivlin, Kowert & Goetzel, P.C.

(57) ABSTRACT

Systems and methods for associating a remote controller with a device are provided. The systems and methods generally relate to receiving a request from a remote controlled to pair the remote controller to a device at several devices and determining at each of the several devices the strength of the wireless pairing request signal received by that device. If a device determines that its received signal is the strongest, the device may be paired with the remote controller. If instead a device determines that its received signal is not the strongest, it may ignore subsequent communications received from the remote controller.

20 Claims, 7 Drawing Sheets

(56) References Cited

U.S. PATENT DOCUMENTS

| | | |
|---|---|---|
| 2004/0070491 A1 | 4/2004 | Huang et al. |
| 2005/0208952 A1 | 9/2005 | Dietrich et al. |
| 2006/0044152 A1 | 3/2006 | Wang |
| 2006/0092037 A1 | 5/2006 | Neogi et al. |
| 2007/0080823 A1 | 4/2007 | Fu et al. |
| 2008/0165024 A1* | 7/2008 | Gretton .............. G01C 21/3655 340/4.31 |

OTHER PUBLICATIONS

"Simple device pairing by relative signal strengths", 2005, ZigBee from Cambridge Consultants, p. 1.

IDS—12519392, Jun. 16, 2009, Alwin Rutjes, p. 2, Citation No. 3, Showing 2005 is the publication date of "Simple Device Pairing by Relative Signal Strengths".

"What light goes with which switch?", http:/fwww.extremetech.com/article2/D, 1697, 1864143, DD .asp, 2DD6, pp. 1-5.

Starlite, Control at the speed of light, http://www.centralite.com/products/Starlite/Starlite_2-2D-D6.pdf, 2DD6, pp. 1-2.

Simple device pairing by relative signal strengths, Zigbee from Cambridge Consultants, www.cambirdgeconsultants.com, 2DD5, pp. 1-2.

\* cited by examiner

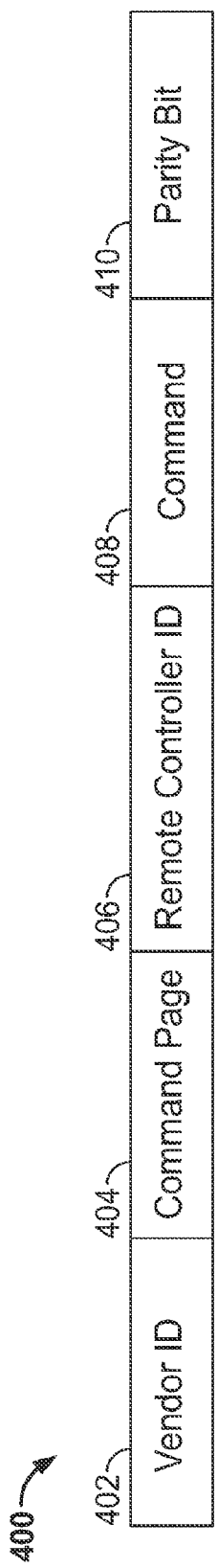
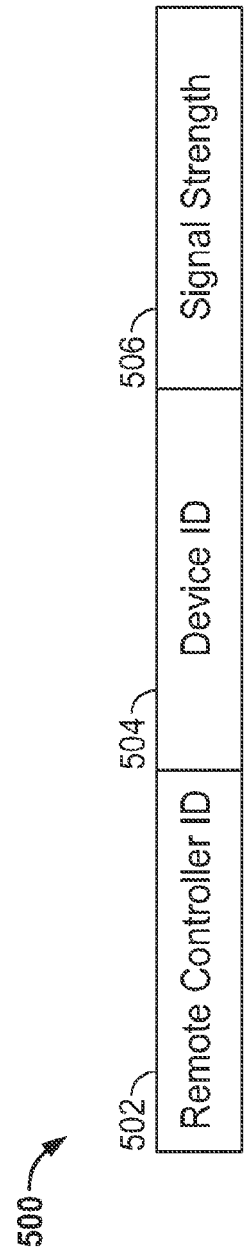
FIG. 4
FIG. 5

INTELLIGENT INFRARED REMOTE PAIRING

CONTINUATION DATA

This application is a continuation of U.S. patent application Ser. No. 12/203,904, filed Sep. 3, 2008, and entitled "Intelligent Infrared Remote Pairing," which is incorporated herein by reference in its entirety as though fully and completely set forth herein.

BACKGROUND OF THE INVENTION

This invention relates generally to remote controllers and devices compatible with remote controllers, and more particularly, to systems and methods for intelligently pairing a remote controller to a device.

A remote controller (also known as remote, remote control, wireless controller, or portable remote controller) allows a user to conveniently operate a device from a distance. Remote controllers are generally included with consumer electronic devices such as televisions, stereos, cable set-top boxes, etc. More recently, newer electronic devices such as computers, video-on-demand (VOD) terminals, portable music players, and mobile phones have been designed to work with remote controller. Furthermore, various remote controller-compatible electronic devices can now be inter-connected via wired and wireless paths.

A typical remote controller can be battery-powered and can include a wireless transmitter, such as infrared transmitter, for sending commands to a device and buttons for specifying particular commands to send, such as POWER ON. A typical host device that works with a remote controller can include a wireless receiver, such as infrared receiver, for receiving commands from the remote controller and logic configured to interpret and carry out the commands. For an in-depth discussion of remote controller, see Jack I-Chieh Fu, et al., "TECHNIQUES FOR PAIRING REMOTE CONTROLLERS WITH HOST DEVICES," U.S. patent application Ser. No. 11/245,937, filed Apr. 12, 2007.

Device vendors can include compatible remote controllers with different kinds of devices it sells. For example, a vendor can include the same type of remote controller with a computer and with a docking station for portable electronic devices. In such a case, the effect of a single device responding to commands from multiple remote controllers can arise. For example, both the remote controller that came with the computer and that came with the docking station can be used to turn on the computer, which can cause user confusion. For example, when the user sends a POWER ON command to turn the computer on using the remote controller that came with the computer, both the computer and the docking station can turn on in response to the POWER ON command.

A current solution to the effect of a single device responding to commands from multiple remote device using a button combination on the remote controller. A remote controller can have a unique identifier transmitter with every command that identifies the command as being from the remote controller. Once that remote controller is paired with a device, the device responds only to commands from that remote controller. However, this solution does not address the effect of multiple devices responding to commands from a single remote controller.

SUMMARY OF THE INVENTION

In accordance with various embodiments of the present invention, systems and methods for improved pairing of remote controllers with devices are provided.

In some embodiments, a method and computer readable media for pairing a remote controller with an electronic device in communication with at least one other electronic device may be provided. The method may include receiving a pairing request from a remote controller, detecting an attribute associated with the reception of the request, and comparing the detected attribute with an attribute detected by the at least one other electronic device. The method may further include pairing the remote controller with the electronic device associated with the largest detected attribute.

In some embodiments, a system for pairing a remote controller with an electronic device may be provided. The system may include a communications network and a remote controller is operative to provide a pairing request. The system may also include several electronic devices in communication via the communications network. Each electronic device may be operative to receive the pairing request, determine a characteristic of the received pairing request, and broadcast the determined characteristics to the other of the plurality of electronic devices. Each electronic device may then determine whether to be paired with the remote controller based on the determined characteristics.

In some embodiments, an electronic device operative to be paired with a remote controller may be provided. The electronic device may be in communication with several electronic devices, and may include control circuitry and receiver. The control circuitry may be operative to direct the receiver to receive a pairing request from the remote controller, detect the strength of signal of the received pairing request, and broadcast the detected strength of signal to the several electronic devices. The control circuitry may also receive a strength of signal detected by at least one of the several electronic devices from the at least one of the several electronic devices and compare the detected strength of signal and the received strength of signal. The control circuitry may selectively pair the device with the remote controller in response to comparing.

For purposes of clarity, and not by way of limitation, the systems and methods can sometimes be described herein in the context of infrared remote controllers and compatible electronic devices (e.g., televisions, set-top boxes, computers, mobile phone/portable music player docking stations, or stereo or audio systems). However, it will be understood that the systems and methods of the present invention can be applied to any other suitable type of remote controller devices and devices compatible with such remote controller devices.

BRIEF DESCRIPTION OF THE DRAWINGS

The above and other objects and advantages of the invention will be apparent upon consideration of the following detailed description, taken in conjunction with the accompanying figures, in which like reference characters refer to like parts throughout, and in which:

FIG. 4 shows an illustrative diagram of a packet transmitted by a remote controller in accordance with some embodiments of the invention;

FIG. 5 shows an illustrative diagram of a packet generated by each electronic device in response to detecting a pairing request in accordance with eerie embodiments of the invention;

DETAILED DESCRIPTION OF THE PRESENT INVENTION

Figure 1:
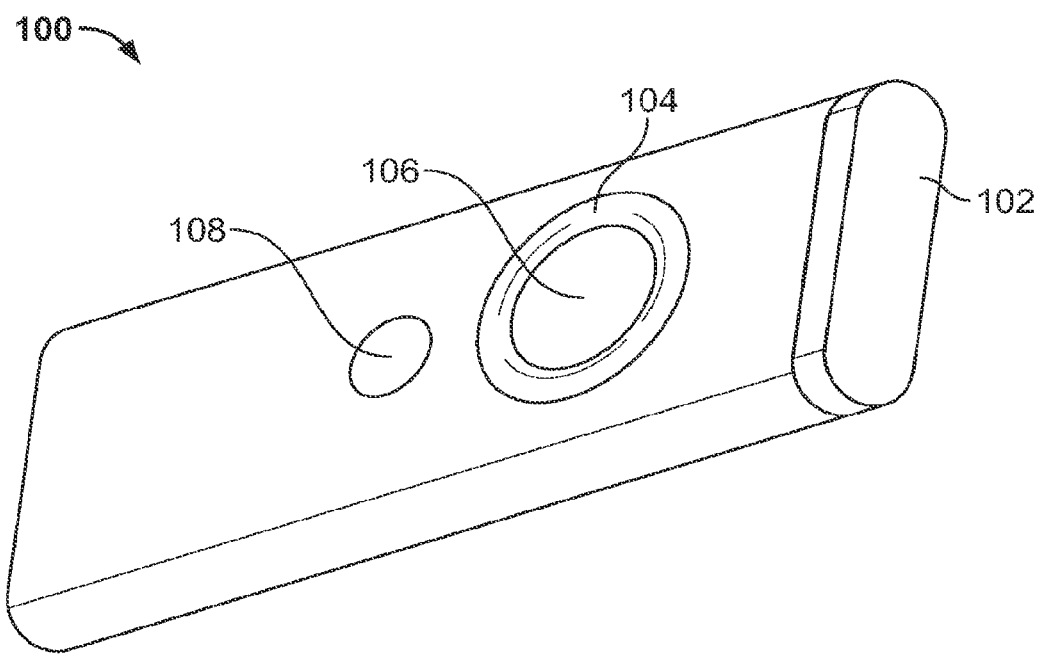
FIG. 1 shows an illustrative diagram of a remote controller that can be paired with a number of different devices in accordance with one embodiment of the invention.

FIG. 1 shows a diagram of remote controller 100 that can be paired with a number of different electronic devices in accordance with one embodiment of the invention. In particular, remote controller 100 can be lightweight, low powered and highly portable. Remote controller 100 can include wireless transmission window 102 through which transmitted tireless (e.g., infrared) signals can be output, and an Input mechanism by which a user may provide inputs. In some embodiments, remote controller 100 can include a set of four input buttons 104 arranged in a circular fashion, a center button 106 that is surrounded by the set of four input buttons 104, and another button 108. The various buttons or input mechanisms can be implemented using any suitable approach, including for example by mechanical switches or touch-sensitive surfaces. The input mechanisms can be mapped to various different functions depending on the particular application program on a host device that is being controlled by remote controller 100. For example, if the application program on the host device being controlled is a media player application, the input mechanisms can provide media playback controls. As an example, the set of four input buttons 104 can provide functions such as volume up, volume down, next track and previous track; center button 106 can provide a play/pause function; and button 108 can provide a menu request function. Other management type commands, such as pairing and unpairing, can be mapped to combinations of input mechanisms to minimize the number of input mechanisms and to avoid accidental management commands. For example, pressing button 108 together with center button 106 can request pairing, and pressing button 108 together with a particular one of the four input buttons 104 can request unpairing.

Figure 2:
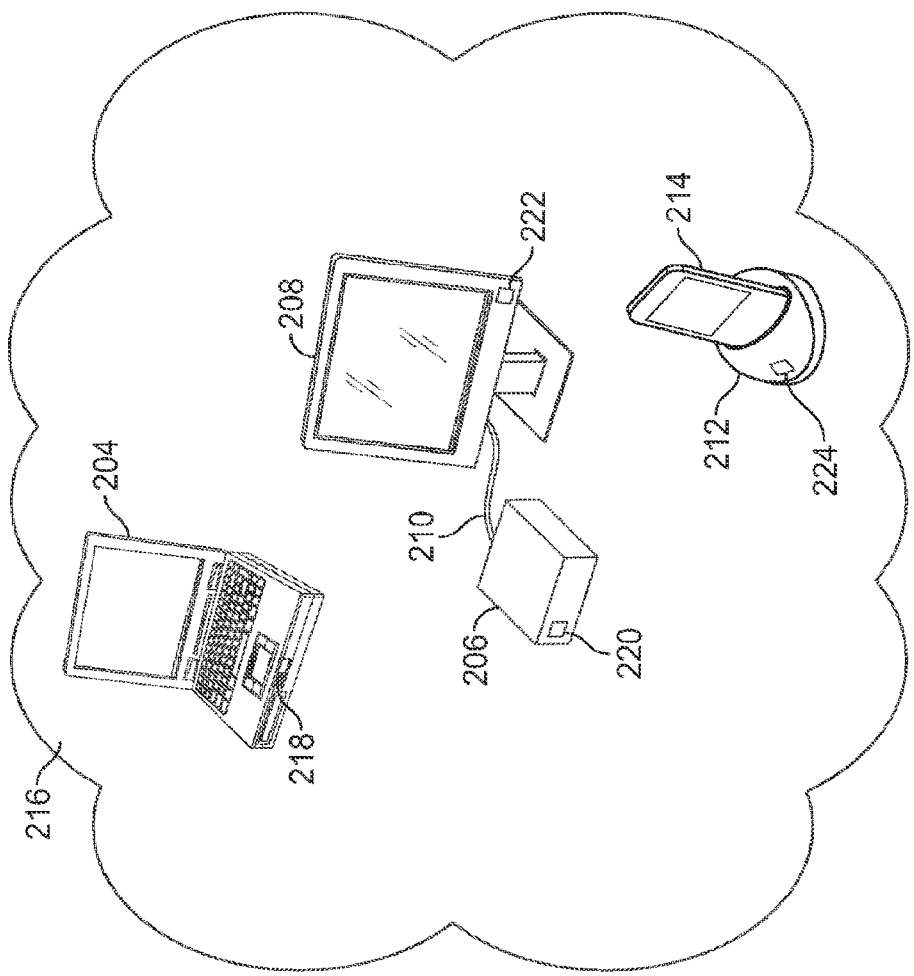
FIG. 2 shows an illustrative diagram of a system that can be used to provide intelligent infrared remote pairing in accordance with one embodiment of the invention.
Figure 2:
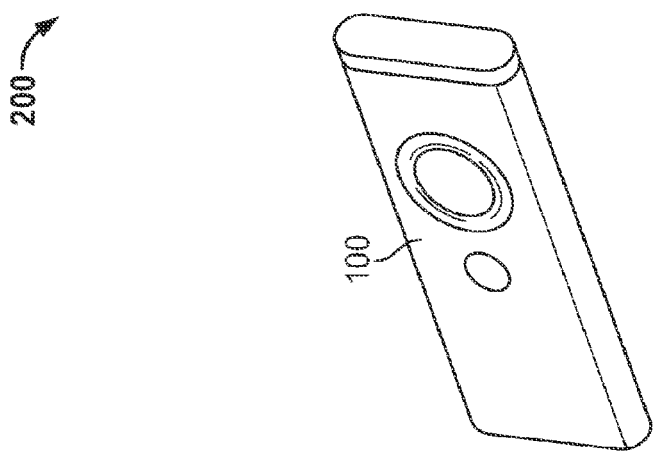

FIG. 2 shows an illustrative diagram of system 200 that can be used to provide intelligent infrared remote pairing in accordance with one embodiment of the invention. In particular, system 200 can include remote controller 100 and electronic devices operative to receive instructions from remote controller 100. Compatible electronic devices can include, for example, laptop computer 204, set-top box 206, television 208 and mobile phone/portable music player docking station 212 with mobile phone 214. Set-top box 206 can be connected to television 208 via connection 210, which may include one or more wired or wireless connections. In some embodiments, remote controller 100 may communicate with the electronic devices other via communications network 216 or via a different communications network (e.g., an IR network). For example, laptop computer 204, set-top box 206, television 208 and docking station 212 can respectively include wireless receiver windows 218, 220, 222 and 224 for receiving wireless communications from remote controller 100 using communications network 216. In addition, each of laptop computer 204, set-top box 206, television 208 and docking station 212 may be interconnected via communications network 216 such that the devices of system 200 may communicate amongst themselves (e.g., using a protocol supported by communications network 216).

Communications network 216 may include any suitable communications network with which remote controller 100 may provide instructions to the electronic devices. In some embodiments, network 102 may support any suitable Internet or Ethernet protocol at different layers, and any suitable communications protocol or connection types, such as, for example, CAN, CIP, automation protocols, SOCKS, Bluetooth (registered trademark), high frequency systems (e.g., 900 MHz, 2.4 GHz, and 5.6 GHz communication systems), infrared, or any other suitable other protocol or connection type. In some embodiments, communications network 216 may include a cellular network providing for data transfers using any suitable network such as, for example, GSM, CDMA, EV-DO, EDGE, 3GSM, or any other suitable cellular network providing for data transfers (e.g., voice or other data) at any suitable speed. Communications network 216 can include one or more communications paths such as a fiber-optic path, a cable path, a wireless path, or any other suitable wired or wireless communications path or combination of such paths.

Figure 3:
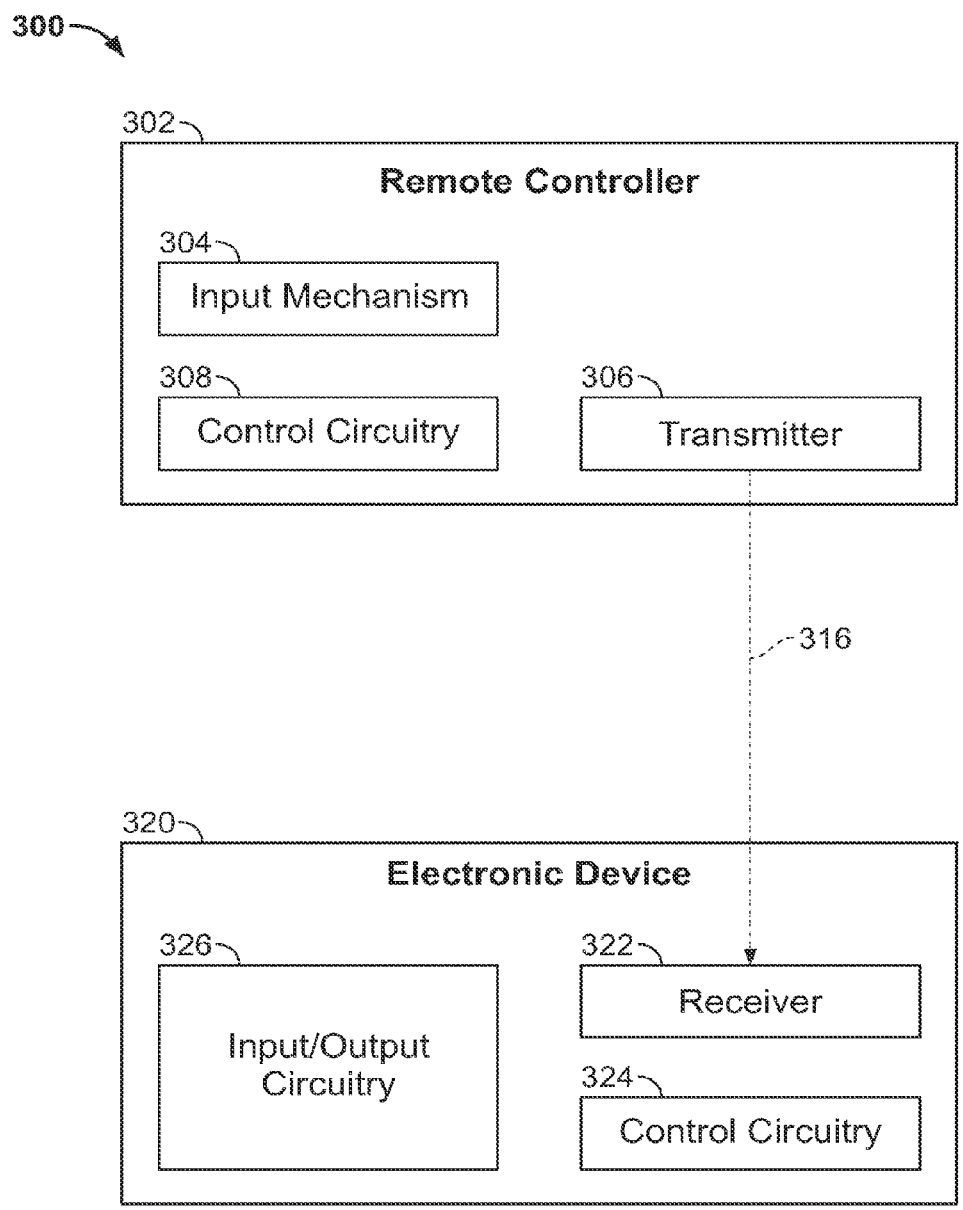
FIG. 3 shows an illustrative diagram of a wireless control system in accordance with one embodiment of the invention.

FIG. 3 shows an illustrative diagram of a wireless control system in accordance with one embodiment of the invention. Wireless control system 300 can include remote controller 302 and electronic device 320. As an example, remote controller 302 can represent remote controller 100 illustrated in FIG. 1, and electronic device 320 can represent one of the devices 204, 206, 208 and 212 illustrated in FIG. 2.

Remote controller 302 can include input mechanism 304, transmitter 306 and power supply 308. Input mechanism 304 may include any suitable input mechanism for detecting an input provided by a user. For example, input mechanism 304 may include a button, keypad, dial, a click wheel, or a touch screen. In some embodiments, input mechanism 304 may include a capacitive sensing mechanism, or a multi-touch capacitive sensing mechanism such as found in an iPhone. In some embodiments, input mechanism 304 may be associated with a display for providing information to a user.

Transmitter 306 may include any suitable transmitting circuitry for providing instructions to electronic device 320. In some embodiments, transmitter 306 may include processing circuitry (e.g., one or more microprocessors, microcontrollers, digital signal processors, or programmable logic devices), storage (e.g., persistent data storage or memory such as random-access memory, read-only memory, cache memory, flash memory, hard drives, or optical drives), and communications circuitry, for example for transmitting instructions over a communications network (e.g., communications network 216, FIG. 2).

Power supply 308 may include any suitable power source for remote controller 302, including for example a battery or other portable power supply, an electrical connection for receiving power from a remote source (e.g., a wall outlet), or any other suitable power supply.

Electronic device 320 may include, for example, control circuitry 322, receiver 324, and input/output circuitry 326. Control circuitry 322 may include any processing circuitry operative to control the operations and performance of electronic device 320. For example, control circuitry 322 may be used to run operating system software, firmware, media playback applications, media editing applications, communications applications, and/or any other application (e.g., via computer program logic recorded on computer readable media). In some embodiments, control circuitry 322 may be operative to run applications and perform operations associated with a resource utilization component, including for example monitoring network resource usage, adjusting network resource usage, providing notices to a user, or any other suitable operation. In some embodiments, control circuitry 322 may drive a display and process inputs received from a user interface.

In some embodiments, control circuitry 322 may include storage and memory. The storage may include, for example, one or more storage mediums including a hard-drive, flash memory, permanent memory such as ROM, any other suitable type of storage component, or any combination thereof. The storage may store, for example, media data (e.g., music and video files), application data (e.g., for implementing functions on electronic device 320), firmware, user preference information data (e.g., media playback preferences), lifestyle information data (e.g., food preferences), exercise information data (e.g., information obtained by exercise monitoring equipment), transaction information data (e.g., information such as credit card information), wireless connection information data (e.g., information that may enable electronic device 320 to establish a wireless connection), subscription information data (e.g., information that keeps track of podcasts or television shows or other media a user subscribes to), contact information data (e.g., telephone numbers and email addresses), calendar information data, and any other suitable data or any combination thereof. The memory can include cache memory, semi-permanent memory such as RAM, and/or one or more different types of memory used for temporarily storing data. In some embodiments, the memory can also be used for storing data used to operate electronic device applications, or any other type of data that may be stored in the storage. In some embodiments, the memory and storage may be combined as a single storage medium.

Receiver 324 can permit electronic device 320 to communication with remote controller 302. For example, receiver 324 may support infrared, Wi-Fi (e.g., a 802.11 protocol), Ethernet, Bluetooth™ (which is a trademark owned by Bluetooth Sig, Inc.), other radio frequency systems, cellular networks (e.g., GSM, AMPS, GPRS, CDMA, EV-DO, EDGE, 3GSM, DECT, IS-136/TDMA, iDen, LTE or any suitable cellular network providing for data transfers), TCP/IP, Voice over IP (VOIP), any other communications protocol, or any combination thereof. In some embodiments, receiver 324 may be operative to perform communications operations with other electronic devices 320 within a communications network (e.g., communicate with other devices within network 216, FIG. 2). For example, electronic device 230 may include several instances of receiver 324 or other communications circuitry for communication with different devices using the same or different communications protocols (e.g., 802.11 communications circuitry and IR communications circuitry).

Input/output circuitry 326 may be operative to convert (and encode/decode, if necessary) analog signals and other signals into digital data. In some embodiments, input/output circuitry can also convert digital data info any other type of signal, and vice-versa. For example, input/output circuitry 326 may receive and convert physical contact inputs (e.g., from a multi-touch screen), physical movements (e.g., from a mouse), analog audio signals (e.g., from a microphone), or any other input. The data can be provided to and received from control circuitry 322 or any other component of electronic device 200.

Electronic device 320 may include any suitable mechanism or component for allowing a user to provide inputs to input/output circuitry 326. For example, electronic device 320 may include any suitable input mechanism, such as for example, a button, keypad, dial, a click wheel, or a touch screen. In some embodiments, electronic device 320 may include a capacitive sensing mechanism, or a multi-touch capacitive sensing mechanism such as found in an iPhone.

As part of input/output circuitry 326, electronic device 320 can include output circuitry associated with output devices such as, for example, one or more audio outputs. The audio output may include one or more speakers (e.g., mono or stereo speakers) built into electronic device 320, or an audio component that is remotely coupled to electronic device 320 (e.g., a headset, headphones or earbuds that may be coupled to communications device with a wire or wirelessly).

In come embodiments, I/O circuitry 326 may include display circuitry (e.g., a screen or projection system) for providing a display visible to the user, for example, the display circuitry may include a screen (e.g., an LCD screen) that is incorporated in electronic device 200 and associated drivers, graphics processors or other integrated circuits. As another example, the display circuitry may include a movable display or a projecting system for providing a display of content on a surface remote from electronic device 320 (e.g., a video projector). The display circuitry also can include display driver circuitry, circuitry for driving display drivers, or both. The display circuitry may be operative to display content (e.g., media playback information, application screens for applications implemented on the electronic device, information regarding ongoing communications operations, information regarding incoming communications requests, or device operation screens) under the direction of control circuitry 322.

In some embodiments, electronic device 320 may include a bus operative to provide a data transfer path for transferring data to, from, or between control circuitry 322, receiver 324, input/output circuitry 326, and any other component included in the electronic device.

Remote controller 302 can communicate with electronic device 320 via communications path 316. Communications path 316 may be provided using any suitable communications network, including any of the networks described above in connection with system 200 (FIG. 2). In response to electronic device 320 receiving a communication from remote controller 302 over communications path 316, electronic device 320 may perform an operation. For example, if electronic device 320 includes a media player program capable of playing digital media stored in storage, remote controller 302 may be used to instruct electronic device 320 to perform media player operations, such as playback controls (e.g., volume changes, next track, previous track, and play and pause operations). Other operations may be performed based on the applications available from or enabled on each electronic device 320.

In environments where several remote controllers, several electronic devices, or both are present, a single remote controller may simultaneously control several electronic devices, or several remote controllers may be used to control a single electronic device. This behavior may be undesirable, as a user wishing to direct only a particular device to perform an operation (e.g., play back media) may have difficulty providing the instruction to only the particular device using a remote controller. To overcome this issue, remote controllers may be paired to one or more electronic devices. For example, in a system that includes a first electronic device (e.g., a computer) and a second electronic device (e.g., a media player, such as an Apple TV), each with a particular remote controller, a user may pair a first remote controller with the first electronic device. This may ensure that the first electronic device only performs operations in response to receiving instructions from the first remote controller. Both the first and a second remote controllers, however, may control the second electronic device, until the second remote controller is paired with the second electronic device.

Communications from remote controllers to a particular electronic device may include information identifying the remote controller, as well as an instruction for the electronic device to perform. FIG. 4 shows an illustrative diagram of a packet transmitted by a remote controller in accordance with some embodiments of the invention. Packet 400 may include several distinct portions, including for example vender identifier (ID) 402, command page 404, remote controller ID 406, command 408 and parity bit 410. Vendor ID 402 may include an 11 bit section representing a fixed vendor identifier, such as an identifier representing the manufacturer of the remote controller. Vendor ID 402 may allow the electronic device to limit allowable commands with respect to more or more particular vendors (e.g., only remotes from authorized manufacturers may be used with Apple products). Command page 404 may include a 5 bit unsigned number. Command page 404 may provide logical groupings for commands, but not necessarily correlating to physical devices or model lines. Remote controller ID 406 may include an 8 bit unsigned number that can support 256 unique values. During manufacturing, each remote controller may be assigned a value, for example stored in control circuitry of the remote controller. The assigning of the IDs can be randomly performed or can be achieved in a serial process where the device identifier is continuously incremented. Remote controller ID 406 may constitute a unique identifier or a pseudo-unique identifier (e.g., due to the limited number of possible values) for the remote controller that may be used for pairing operations. Command 408 may include a 7 bit number. Command 408 can specify the particular command being requested by remote controller 100 that sends the packet, which may include a user command, action, status or event. Examples of commands can include a paring request, a reset to factory default, low battery condition, repeater packet, unpairing request, or any other suitable command. Parity bit 410 can provide for basic error correction with respect to the packet, for example by setting parity bit 410 to 0 or 1 based on other bits in the packet.

In systems having many electronic devices, several electronic devices may receive a pairing request transmitted by a remote controller (e.g., using a packet similar to packet 400, FIG. 4 in which the command page and command sections include a pairing command). In particular, electronic devices other than the one that a user wishes to pair with a remote controller may receive the pairing request. An additional process may therefore be necessary to ensure that only the desired electronic device is paired with the remote controller. In some embodiments, the electronic devices may provide information to the remote controller to ensure the pairing operation is properly conducted. This approach, however, may require additional communications circuitry on the remote controller, as it must be able to in addition receive communications (e.g., support bi-directional communications). This may increase the complexity and cost of the remote controller.

In some embodiments, an electronic device receiving a pairing request may leverage communications paths with other electronic devices within the system (e.g., other electronic devices within communications network 216, FIG. 2) to determine which electronic device the user intended to pair the remote controller. For example, in response to receiving a pairing request, each electronic device within the system that received the request may broadcast information related to the particular pairing request detected by the electronic device. FIG. 5 shows an illustrative diagram of a packet generated by each electronic device in response to detecting a pairing request in accordance with some embodiments of the invention. Packet 500 may include several sections, including for example Remote Controller ID 502, device ID 504 and signal strength 506. Remote controller ID 502 may include an 8 bit unsigned number that can support 256 unique values, including for example the value of Remote controller ID 406 (FIG. 4) from the received packet associated with the pairing request. Device ID 504 may include an 8 bit unsigned number that can support 256 unique values, for example set during manufacturing of each electronic device or by a communications network (e.g., as the device is added to the communications network and communicates with other devices within the communications network). Device ID 504 may constitute a unique identifier or a pseudo-unique identifier (e.g., due to the limited number of possible values) for each electronic device within the communications network.

Signal strength 506 may include a 3 or 4 bit number associated with the signal strength of the received pairing request. For example, control circuitry of each electronic device may compare the signal strength of the received pairing request signal with one or store pre-defined thresholds or values to determine the strength of the signal. The electronic device may then associate the determined strength of signal with a value, for example in the range of 0-7 (e.g., 3 bit signal strength) or 0-15 (e.g., 4 bit signal strength). Each electronic device may then broadcast a packet 500 to the other electronic devices within the network, and compare the value of signal strength 506 detected by the other electronic devices (e.g., identified from packets 500 broadcast by the other electronic devices) with its own value of signal strength 506. If an electronic device determines that another electronic device in the network has a higher value for signal strength 506, the electronic device may ignore all subsequent commands associated with remote controller ID 502. If instead an electronic device determines that no other electronic device in the network has a higher value for signal strength 506, the electronic device may pair itself with the remote controller identified by remote controller ID 502. Using this approach, therefore, a remote controller may be paired with a single electronic device and not paired with other electronic devices within the same network without requiring bi-direction communications from the remote controller.

Figure 6:
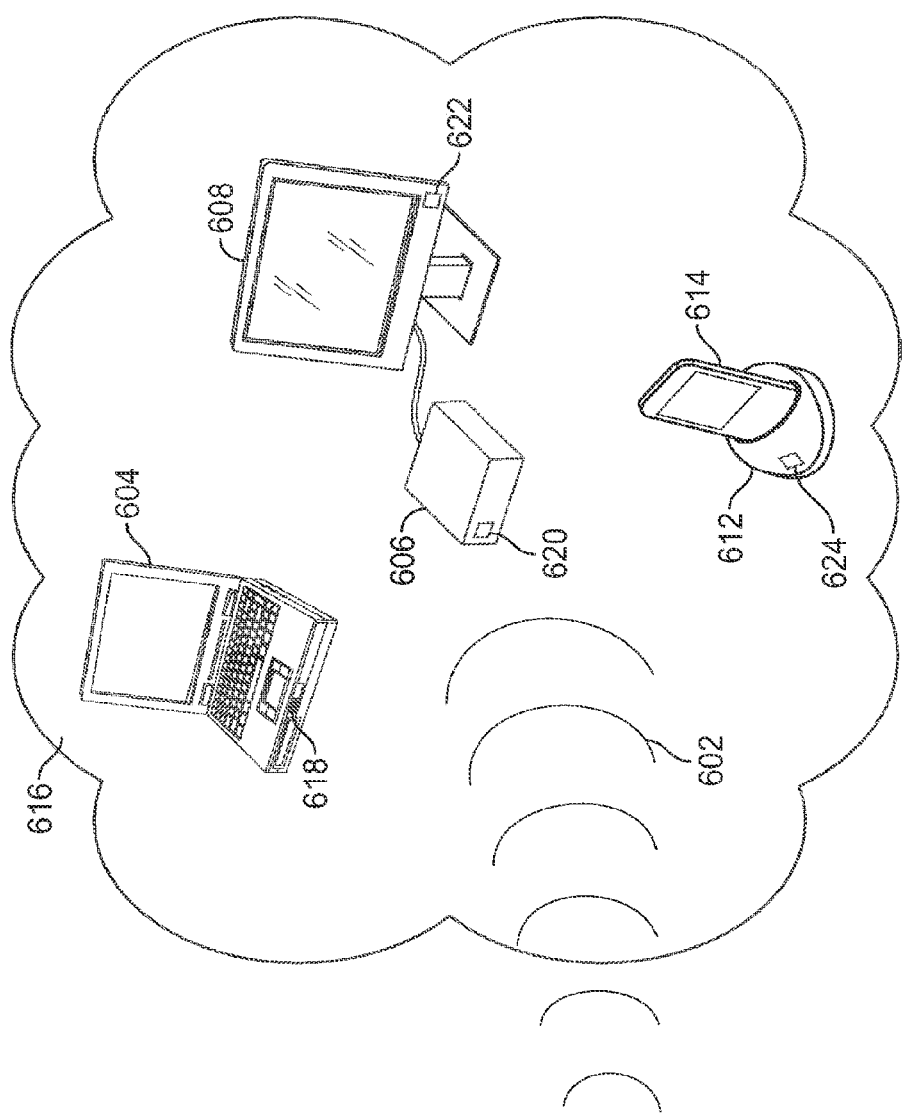
FIG. 6 shows a diagram illustrating pairing a remote controller with a particular electronic device in accordance with one embodiment of the invention.

FIG. 6 shows a diagram illustrating pairing a remote controller with a particular electronic device in accordance with one embodiment of the invention. The system may include remote controller 600, computer 604, set-top box 606, television 608 and docking station 612 for media player

614. Each of computer 604, set-top box 606, television 608, docking station 612 and media player 614 may include some or all of the features of computer 204, set-top box 606, television 208, docking station 212 and mobile phone 214 (FIG. 2), respectively. The various electronic devices may be coupled to each other via communications network 616, which may include one or more features of communications network 216 (FIG. 2).

To pair remote controller 600 with set top box 606, the user may point remote controller 600 at the set top box and provide an input associated with a pairing instruction (e.g., using the input mechanism of the remote controller). In response to receiving the pairing instruction remote controller 600 may broadcast one or more packets associated with the pairing instruction using communications path 602. For example, remote controller 600 may transmit a packet similar to packet 400 (FIG. 4) in which the Command Page and Command data are associated with a pairing request.

Because every electronic device within range of remote controller 600 may receive the pairing instruction via windows 618, 620, 622 and 624, an additional step may be necessary to ensure that only the desired device (e.g., set top box 606) is paired with remote controller 600. In response to receive the pairing request (e.g., a packet such as packet 400), each electronic device within communications network 616 may generate a communication characterizing the received pairing, request. For example, each electronic device may generate a packet similar to packet 500 (FIG. 5) that includes the identifier for remote controller 600 and an attribute or characteristic of the detected pairing request that may distinguish the pairing requests received by each device within communications network 616. For example, the packet may include an indication of the strength of the received pairing request signal.

Each device may receive a packet similar to packet 500 from each of the devices within communications network 616 that received the pairing request. For example, set top box 606 may receive a packet from laptop 604 and from television 608, but no packet from docking station 612 because docking station 612 was out of range of remote controller 600. Set top box 606 may then compare the attribute of the pairing request (e.g., the strength of signal) from the received packets with its own detected attribute. If set top box 606 determines that the attribute from a received packet is larger (e.g., value 7) than its own detected attribute (e.g., value 3), set top box 606 may conclude that the user wished to pair another electronic device (e.g., the device with the largest attribute) with remote controller 600. If instead set top box 606 determines that its own detected attribute (e.g., value 9) is larger than the attributes of the received packets (e.g., values 4 and 6), set top box 606 may conclude that the user wished to pair remote controller 600 with set top box 606 and perform the pairing operation. In some embodiments, set top box 606 may further send a transmission to the other devices within communications network 616 to inform the other devices that set top box 606 is paired with remote controller 600 and to ignore subsequent instructions (e.g., other than pairing requests) from remote controller 600. This step may be desirable if the initial pairing request was not received by all of the devices within the network (e.g., the other devices are not aware of the pairing request).

To provide an indication to a user that a device within network 616 has been paired with remote controller 600, the device may provide an audio or 10 visual indication of the pairing. For example, the electronic device may provide an audio output (e.g., a beep or tone) to indicate that it has been paired with remote controller 600. As another example, the electronic device may provide a visual pattern using one or more LEDs or other visual indicators. Instead or alternatively, the electronic device may display a message indicating that it has been paired (e.g., provide a display with details of the pairing or of remote controller 600).

If remote controller 600 is positioned such that a pairing request is received with the same attributes by at least two devices within communications network 616 (e.g., two devices receive the pairing request with the same signal strength), the devices may not have enough information to determine which device to pair with remote controller 600. In some embodiments, the electronic devices may let the pairing request time out so that the user may move closer to the desired devices (e.g., move away from docking station 612 and closer to set top bow 606) and provide the pairing request again. In some embodiments, the electronic devices may instead or in addition provide the user with an opportunity to identify the particular device that the user wished to pair with remote controller 600. For example, the electronic device may provide an audio or visual message prompting the user to identify one of the several devices (e.g., provide a display listing the devices having similar signal strength to allow the user to select one of or another device). The user may respond to the prompt using the input mechanism of remote controller 600, the input mechanism of the electronic device providing the prompt, or the input mechanism of any device within, communications network 616.

Figure 7:
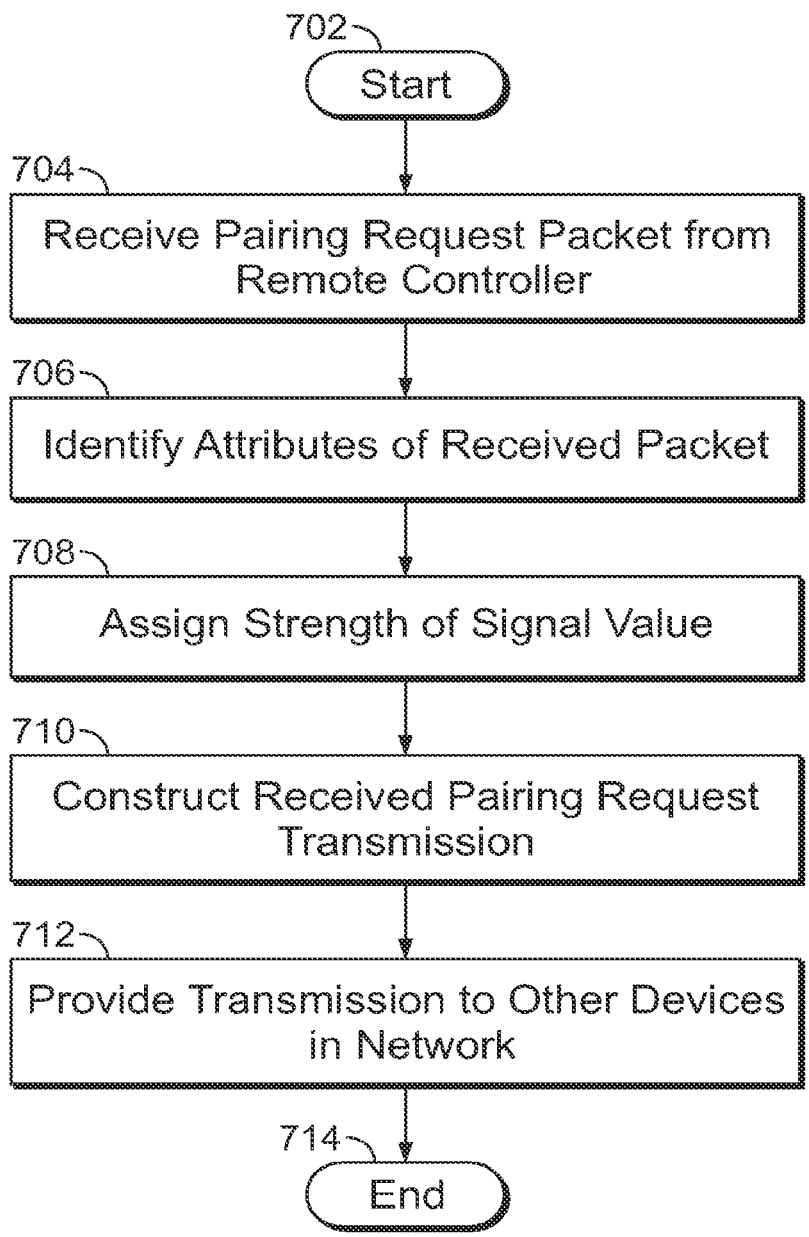
FIG. 7 shows a flow chart of an illustrative process for receiving a pairing request from a remote controller with a device in accordance with one embodiment of the invention.

FIG. 7 shows a flow chart of an illustrative process for receiving a pairing request from a remote controller with a device in accordance with one embodiment of the invention. Process 700 may begin at step 702. At step 704, the electronic device may receive a pairing request packet from a remote controller. For example, an electronic device within a communications network may receive a packet from a remote controller (e.g., a packet in the format of packet 400, FIG. 4) that includes a pairing instruction (e.g., in a command page and a command portion of the packet). At step 706, the electronic device may process the received packet to determine attributes related to the received transmission of the packet. For example, the electronic device may determine the strength of the signal associated with the received packet. As another example, the electronic device may extract from the received portions of the packet an indication of the quality of the communications link between the remote controller and the electronic device (e.g., was all of the packet data received, as determined from a checksum). At step 708, the electronic device may assign a strength of signal value or an indication of the attribute quality to the received packet. For example, the electronic device may assign a numerical value (e.g., in the range of 0-15) to the received signal.

At step 710, the electronic device may construct a received pairing request transmission for the other devices within the communications network. The transmission may include information identifying the received pairing request, such as a remote controller identifier associated with the remote controller providing the pairing request, and an identifier for the electronic device providing the transmission. In some embodiments, the received pairing request transmission may include the assigned strength of signal value or another measurable detected attribute of the received pairing request packet. The transmission may take any suitable format, including for example the formal of packet 500 (FIG. 5). At step 712, the electronic device may provide the transmission constructed at step 710 to the other devices of the communications network. For example, the electronic device may broadcast the transmission as a packet to the other devices of the network. Process 700 may then end at step 714.

Figure 8:
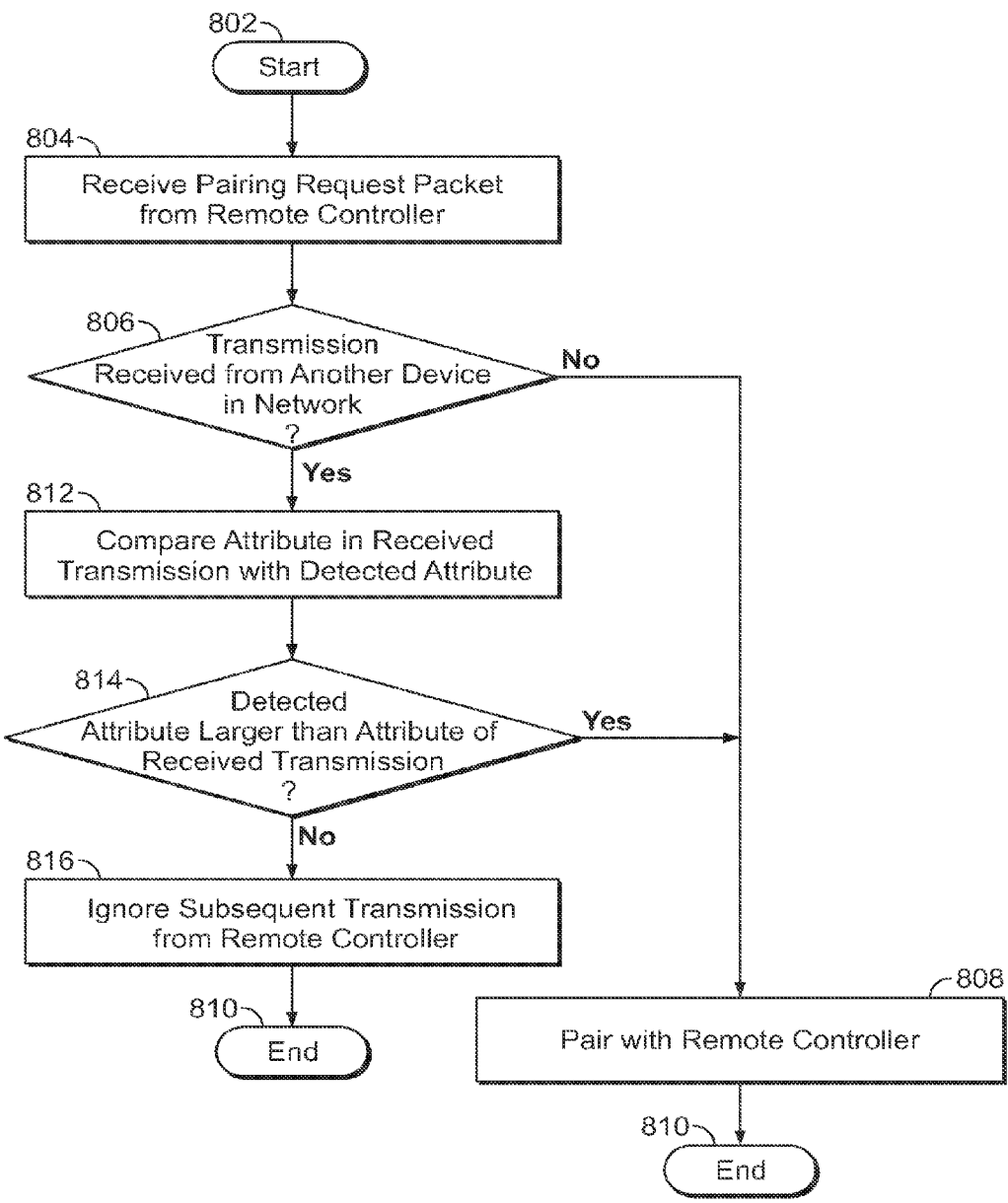
FIG. 8 shows a flowchart of an illustrative process for identifying the electronic device to pair with a remote controller in accordance with one embodiment of the invention.

FIG. 8 shows a flowchart of an illustrative process for identifying the electronic device to pair with a remote controller in accordance with one embodiment of the invention. Process 800 may begin at step 802. At step 804, the electronic device may receive a pairing request packet from a remote controller. For example, an electronic device within a communications network may receive a packet from a remote controller (e.g., a packet in the format of packet 400, FIG. 4) that includes a pairing instruction (e.g., in a command page and a command portion of the packet). At step 806, the electronic device may determine whether a transmission associated with a pairing request is received from another electronic device within a communications network. For example, the electronic device may determine whether a transmission such as those provided using process 700 (FIG. 7) is received from another device within the network. If the electronic device determines that no such transmission is received from another device within the network, process 800 may move to step 808 and pair the electronic device with the remote controller. In other words, the electronic device may conclude that no other device received the pairing request and therefore the user intended to pair the remote controller only with the electronic device. The electronic device may in addition, as part of the pairing process, provide an indication to the other devices within the network that it has been paired with the remote controller so that the other devices in the network may ignore subsequent instructions received from the remote controller. In some embodiments, however, this step may not be necessary as every device within the network may have received the initial transmission from the at least one device that detected the pairing request (e.g., every device receives or generates at least one transmission generated by process 700). Process 800 may then end at step 810.

If, at step 806, the electronic device instead determines that a transmission associated with a pairing request was received from another device in the network, process 800 may move to step 812. At step 812, the electronic device may compare the attribute of the pairing request in the received transmission with the attribute detected by the electronic device. For example, the electronic device may compare the strength of signal of the received transmission (e.g., part of packet 500, FIG. 5) with the detected strength of signal of the pairing request received at step 804. If the electronic device did not detect the initial pairing request (e.g., the electronic device was out of range of the remote controller), the electronic device may be assigned a low or 0 value for the attribute. At step 814, the electronic device may determine whether the detected attribute is larger than the attribute of the received transmission. For example, the electronic device may determine whether the detected strength of signal is larger than the strength of signal of the received transmission. If the electronic device determines that the attribute of the received transmission is not larger than the detected transmission, process 800 may move to step 808 described above.

If the electronic device instead determines that the attribute of the received transmission is larger than the detected transmission, process 800 may move to step 816. At step 816, the electronic device may ignore subsequent transmissions from the remote controller. For example, the electronic device may assume that the remote controller was paired with the device in the communications network that had the largest detected attribute, and therefore ignore all transmissions other than pairing requests from the paired remote controller. Process 800 may then end at step 810.

The order in which the steps of the present methods are performed is purely illustrative in nature. In fact, the steps can be performed in any order or in parallel, unless otherwise indicated by the present disclosure. The various elements of the described embodiments can be exchanged/mixed, unless otherwise indicated by the present disclosure. The invention can be embodied in other specific forms without departing from the spirit or essential characteristics thereof. The foregoing embodiments are each therefore to be considered in all respects illustrative, rather than limiting of the invention. Thus, the present invention is only limited by the claims which follow.

What is claimed is:

1. A method for processing a pairing request from a first remote controller by a first electronic device in communication with at least one other electronic device, the method comprising:
   at the first electronic device:
      receiving from a second electronic device of the at least one other electronic device, a transmission reporting a first signal attribute of a pairing request received by the second electronic device from the first remote controller;
      determining not to pair the first electronic device with the first remote controller, based at least in part on the first signal attribute; and
      ignoring subsequent transmissions received from the first remote controller, based at least in part on the determining not to pair the first electronic device with the first remote controller.

2. The method of claim 1, wherein the determining not to pair the first electronic device with the first remote controller comprises:
   at the first electronic device:
      receiving the pairing request from the first remote controller;
      detecting a second signal attribute of the pairing request received by the first electronic device;
      comparing the second signal attribute with the first signal attribute; and
      determining not to pair the first electronic device with the first remote controller in response to the comparing.

3. The method of claim 2, wherein the second signal attribute comprises a signal strength of the received pairing request at the first electronic device, and wherein the first signal attribute comprises a signal strength of the pairing request at the second electronic device.

4. The method of claim 2, further comprising broadcasting the second signal attribute to the at least one other electronic device.

5. The method of claim 1, wherein the determining not to pair the first electronic device with the first remote controller comprises:
   at the first electronic device:
      determining that the first electronic device received no pairing request from the first remote controller; and
      determining not to pair the first electronic device with the first remote controller in response to the determining.

6. The method of claim 1, wherein the determining not to pair the first electronic device with the first remote controller is based on one of:

a determination that the first electronic device received no pairing request from the first remote controller; or a determination that a pairing request received by the first electronic device from the first remote controller comprises a second attribute that is smaller than the first attribute.

7. The method of claim 6, further comprising broadcasting the second attribute to the at least one other electronic device.

8. A non-transitory computer-readable medium for processing a pairing request from a first remote controller by a first electronic device in communication with at least one other electronic device, the computer-readable medium storing instructions configured to cause the first electronic device to:

receive from a second electronic device of the at least one other electronic device, a transmission reporting a first signal attribute of a pairing request received by the second electronic device from the first remote controller;

determine not to pair the first electronic device with the first remote controller, based at least in part on the first signal attribute; and ignore subsequent transmissions received from the first remote controller, based at least in part on the determining not to pair the first electronic device with the first remote controller.

9. The non-transitory computer-readable medium of claim 8, wherein the instructions configured to cause the first electronic device to determine not to pair the first electronic device with the first remote controller are further configured to cause the first electronic device to:

receive the pairing request from the first remote controller;

detect a second signal attribute of the pairing request received by the first electronic device;

compare the second signal attribute with the first signal attribute; and determine not to pair the first electronic device with the first remote controller in response to the comparing.

10. The non-transitory computer-readable medium of claim 9, wherein the second signal attribute comprises a signal strength of the received pairing request at the first electronic device, and wherein the first signal attribute comprises a signal strength of the pairing request at the second electronic device.

11. The non-transitory computer-readable medium of claim 9, wherein the instructions are further configured to cause the first electronic device to broadcast the second signal attribute to the at least one other electronic device.

12. The non-transitory computer-readable medium of claim 8, wherein the instructions configured to cause the first electronic device to determine not to pair the first electronic device with the first remote controller are further configured to cause the first electronic device to:

determine that the first electronic device received no pairing request from the first remote controller; and determine not to pair the first electronic device with the first remote controller in response to the determining.

13. The non-transitory computer-readable medium of claim 8, wherein the determining not to pair the first electronic device with the first remote controller is based on one of:

a determination that the first electronic device received no pairing request from the first remote controller; or a determination that a pairing request received by the first electronic device from the first remote controller comprises a second attribute that is smaller than the first attribute.

14. The non-transitory computer-readable medium of claim 13, wherein the instructions are further configured to cause the first electronic device to broadcast the second attribute to the at least one other electronic device.

15. A first electronic device in communication with at least one other electronic device, the first electronic device comprising:

control circuitry; and
a receiver;
wherein the control circuitry and the receiver are configured to:

receive from a second electronic device of the at least one other electronic device, a transmission reporting a first signal attribute of a pairing request received by the second electronic device from a first remote controller;

determine not to pair the first electronic device with the first remote controller, based at least in part on the first signal attribute; and ignore subsequent transmissions received from the first remote controller, based at least in part on the determining not to pair the first electronic device with the first remote controller.

16. The first electronic device of claim 15, wherein, in determining not to pair the first electronic device with the first remote controller, the control circuitry and the receiver are further configured to:

receive the pairing request from the first remote controller;

detect a second signal attribute of the pairing request received by the first electronic device;

compare the second signal attribute with the first signal attribute; and determine not to pair the first electronic device with the first remote controller in response to the comparing.

17. The first electronic device of claim 16, wherein the second signal attribute comprises a signal strength of the received pairing request at the first electronic device, and wherein the first signal attribute comprises a signal strength of the pairing request at the second electronic device.

18. The first electronic device of claim 16, wherein the control circuitry and the receiver are further configured to broadcast the second signal attribute to the at least one other electronic device.

19. The first electronic device of claim 15, wherein, in determining not to pair the first electronic device with the first remote controller, the control circuitry and the receiver are further configured to:

determine that the first electronic device received no pairing request from the first remote controller; and determine not to pair the first electronic device with the first remote controller in response to the determining.

20. The first electronic device of claim 15, wherein the determining not to pair the first electronic device with the first remote controller is based on one of:

a determination that the first electronic device received no pairing request from the first remote controller; or a determination that a pairing request received by the first electronic device from the first remote controller comprises a second attribute that is smaller than the first attribute.

* * * * *